(12) United States Patent
Whitfield

(10) Patent No.: US 6,693,921 B1
(45) Date of Patent: Feb. 17, 2004

(54) SYSTEM FOR USE OF PACKET STATISTICS IN DE-JITTER DELAY ADAPTION IN A PACKET NETWORK

(75) Inventor: Michael C. Whitfield, Valbonne (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/452,088

(22) Filed: Nov. 30, 1999

(51) Int. Cl.[7] .................................................. H04J 3/06
(52) U.S. Cl. ...................................................... 370/516
(58) Field of Search ................................ 370/516, 517, 370/519, 507, 356, 503, 509, 394, 252, 352, 508, 576, 518; 375/356, 359; 714/761, 762, 763

(56) References Cited

U.S. PATENT DOCUMENTS

| | | | |
|---|---|---|---|
| 4,707,831 A | * 11/1987 | Weir et al. | ................... 370/416 |
| 5,121,383 A | 6/1992 | Golestani | |
| 5,570,346 A | 10/1996 | Shur | |
| 5,623,483 A | * 4/1997 | Agrawal et al. | ............ 370/253 |
| 5,652,627 A | 7/1997 | Allen | |
| 5,825,771 A | * 10/1998 | Cohen et al. | ................ 370/394 |
| 5,963,551 A | * 10/1999 | Minko | ........................ 370/356 |
| 6,259,677 B1 | * 7/2001 | Jain | ............................ 370/252 |
| 6,452,950 B1 | * 9/2002 | Ohlsson et al. | ............. 370/516 |

* cited by examiner

Primary Examiner—Chi Pham
Assistant Examiner—Alexander O. Boakye
(74) Attorney, Agent, or Firm—Farjami & Farjami LLP

(57) ABSTRACT

A system which compensates for jitter in the transfer of voice data over packet data networks. A predetermined quality of service factor is used to determine the jitter delay for received voice packets in order to optimize the number of voice packets received. The invention uses packet sequence information in the voice packet protocol to determine which voice packets are missing and which voice packets are late within a predetermined statistically significant interval. The jitter delay is decreased when the number of missing packets is significantly less than that specified by the quality of service factor. In most cases, the jitter delay is increased when the number of missing packets is greater than that specified by the quality of service factor. The jitter delay is not increased past a certain value when no late packets are observed during the predetermined interval.

30 Claims, 3 Drawing Sheets

SYSTEM FOR USE OF PACKET STATISTICS IN DE-JITTER DELAY ADAPTION IN A PACKET NETWORK

TECHNICAL FIELD

The present invention relates, generally, to voice over Internet and, more particularly, to a system and method for using packet statistics to control de-jitter delay in voice over packet data networks to optimize voice playback quality.

BACKGROUND AND TECHNICAL PROBLEMS

Packets traveling over a packet data network encounter a propagation delay, which is the interval between the time a packet is transmitted and the time the packet is received. A problem, referred to as jitter, occurs when the propagation delay of successively transmitted packets is not constant. Jitter can be described as the difference between the actual propagation delay of a specific packet and the, average propagation delay of some predetermined number of packets.

A packet, such as a voice packet or a data packet, comprises a group of binary digits which are transmitted and switched as a logical unit. When voice is transmitted over a packet data network, the transmitter interposes a fixed time interval between the transmission of each successive packet. These same intervals are required between voice packets at the time the packets are played back in order to ensure smooth playback quality. Traditional telephone networks are circuit switched, and thus avoid problems associated with timely arrival of packets. However, when voice packets are to be transferred over data networks, such as voice over the Internet, there is no guarantee of consistent time delays between the voice packets as is the case with telephone networks. Jitter, if not compensated for, degrades the playback quality of real time voice signals carried by the voice packets.

Because packet data networks, such as the Internet, cannot guarantee the delivery time of data packets (or their order, for that matter), the packets arrive at an inconsistent rate. Therefore, the packets are received with variable delays between them rather than the fixed delay (interval) originally interposed between each packet. The variability in the arrival rate of data causes jitter in the received packets. In order to alleviate problems due to jitter, it is well known to use a buffer (called a 'jitter buffer') at the receiver end of a system to provide a delay, called 'de-jitter' delay, to compensate for these variable delays.

Most systems use a jitter buffer to store at least one packet of data from the network before passing it to a playback device. These buffers can significantly reduce the occurrence of data starvation and ensure the timing is correct when sending data to the playback device. Without jitter buffers, gaps in the data would cause the voice playback to sound choppy or distorted. The jitter buffer provides an adjustable length time window which can be expanded as necessary to allow for varying delays between received packets, particularly packets whose propagation time is longer than the average. These 'late' packets can thus be re-assembled in slightly-delayed real time into a voice stream to be played back with the original fixed delay between them.

Some presently known methods for receiving voice transmitted over packet data networks use immediate decision schemes to adjust the size of the window for receiving a voice packet (the de-jitter delay). Immediate decision schemes determine whether a given packet arrives within a predetermined time relative to a preceding packet. If a given packet does not arrive within the predetermined time, then the packet is considered 'late'. In other words, a voice packet is late if it does not arrive within the existing window for receiving a voice packet. In order to reduce the number of 'late' packets, the de-jitter delay is increased to expand the window for receiving the voice packet. This increases the probability that subsequent late packets will have time to arrive.

Such immediate decision schemes typically increase the de-jitter delay until a required quality of service (QOS) is achieved or a maximum de-jitter delay is reached. This QOS is a predetermined range, number, percentage, or the like defining a parameter related to the number of packets which are considered late in a given period of time. For example, the QOS may require a certain percentage of transmitted voice packets to arrive 'on-time' within this time period. The QOS may also limit the de-jitter delay to a predetermined maximum time. However, immediate decision schemes make no distinction between late packets and lost packets. 'Late' voice packets are those packets which do not arrive at the receiver within the time during which reconstruction of the voice stream must occur. 'Lost' packets are those which never arrive at the receiver. Therefore increasing the de-jitter delay indefinitely will not help recover lost packets. Immediate decision schemes treat both late and lost packets as 'missing' packets. Thus, since no distinction is made between late packets and lost packets, in an attempt to capture 'missing' packets, where all of the packets are 'lost' packets, existing systems may increase the de-jitter delay to an unnecessarily long period of time. This lengthy de-jitter delay degrades system performance without improving voice playback quality.

Another known method, Digital Simultaneous Voice and Data (DSVD) uses an error correction scheme which recognizes when a packet is late and subsequently tries to correct the error by adjusting the de-jitter delay. However, this method also fails to distinguish between late and lost voice packets, so that the de-jitter delay may be unnecessarily increased. Alternatively, voice reconstruction software may use forward error correction to reconstruct the lost voice packets. However, forward error correction requires transfer of redundant information in each subsequent voice packet which degrades overall system performance.

Voice playback quality is degraded when jitter is not compensated for. In addition, the problem of unnecessarily increasing the de-jitter delay without providing a corresponding improvement in voice playback quality remains unresolved by the prior art. A method is needed which overcomes the shortcomings of the prior art in determining how to effectively adjust the de-jitter delay in order to achieve smooth playback quality.

SOLUTION

The present invention provides an improved method for improving voice playback quality by intelligently compensating for jitter in the transfer of voice data over packet data networks. A predetermined quality of service factor is used to determine the jitter delay for received voice packets in order to optimize the number of voice packets received. The invention uses packet sequence information in the voice packet protocol to determine which voice packets are missing and which voice packets are late within a predetermined statistically significant interval. The jitter delay is decreased when the number of missing packets is significantly less than that specified by the quality of service factor. In most cases, the jitter delay is increased when the number of missing packets is greater than that specified by the quality of service factor. However, the present method does not increase the jitter delay at all when no late packets are observed during the predetermined interval.

BRIEF DESCRIPTION OF THE DRAWINGS

The invention is described in conjunction with the appended drawings, wherein like numerals denote like elements, and.

DETAILED DESCRIPTION

Figure 1:
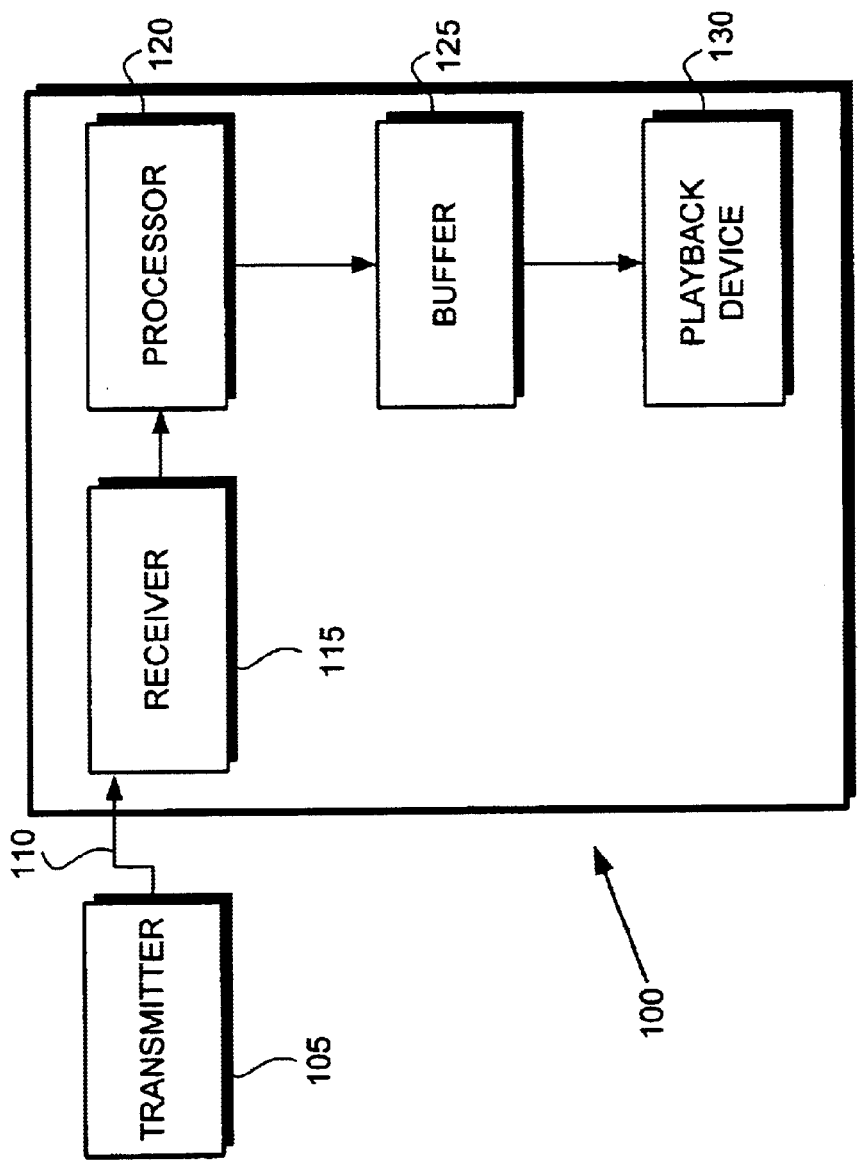
FIG. 1 illustrates a communications system for transferring packets over a packet data network.

FIG. 1 is a high-level block diagram illustrating typical components of a system for transmitting data, such as voice packets, over a packet data network. The system shown in FIG. 1 includes a transmitter 105, a packet data network 110, such as the Internet, and a receiving system 100 which includes a receiver 115, a digital processor 120, a buffer 125, and an audio playback device 130. Voice packets are sent from transmitter 105 over packet data network 110 to receiver 115. Receiver 115 transfers the voice packets to digital processor 120, which in turn, transfers the voice packets to jitter buffer 125. In operation, voice packets are transferred from buffer 125 to playback device 130, which converts the digital voice data to an analog audio signal and plays back the signal. Receiver 115, digital processor 120, jitter buffer 125, and playback device 130 may be separate devices, or may coexist within one or more integrated units.

Figure 2:
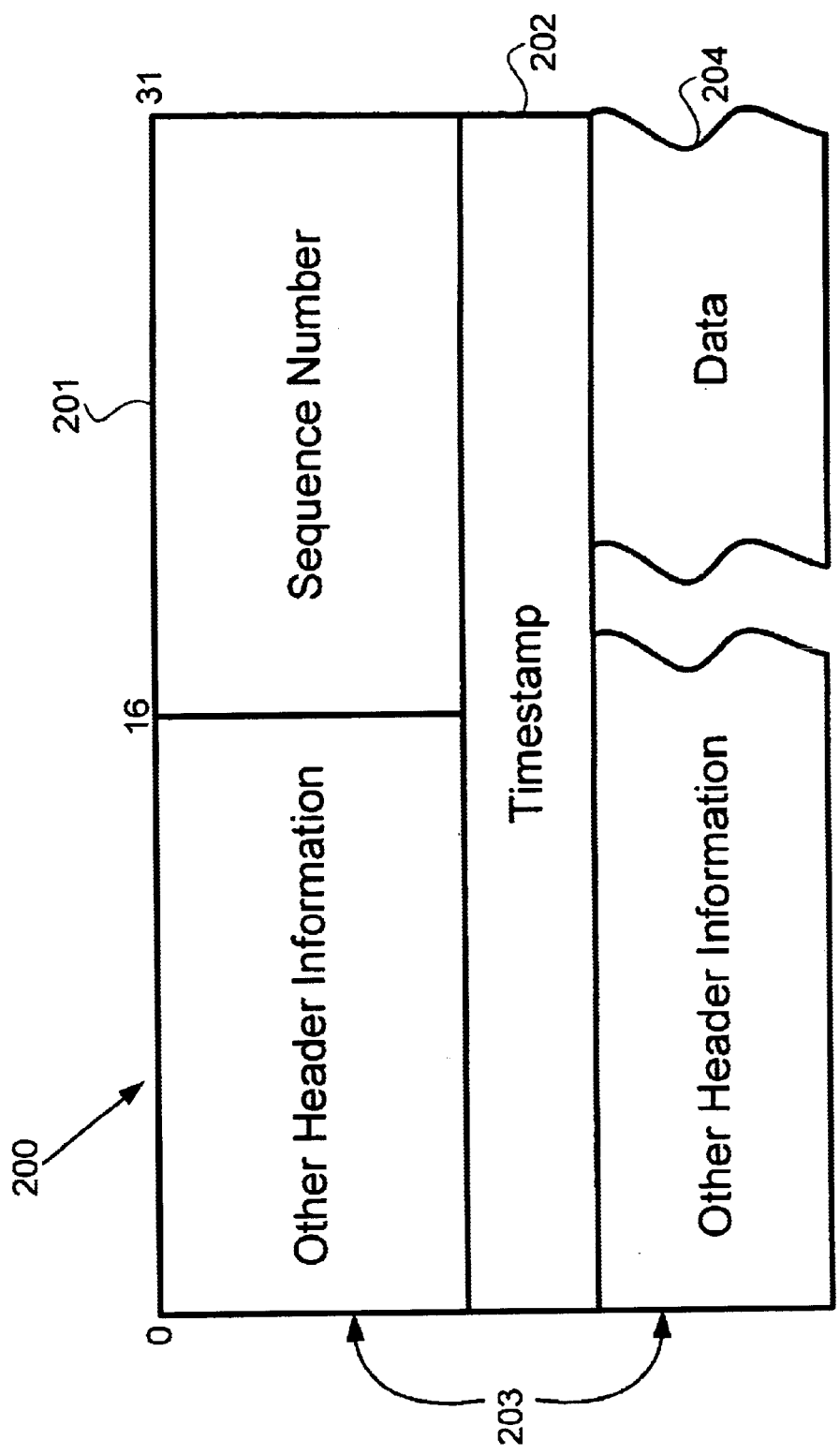
FIG. 2 illustrates the format of an RTP packet.

In an exemplary embodiment of the present system, RTP (Real Time Protocol) is used in conjunction with UDP (User Datagram Protocol) and IP (Internet Protocol) to provide transmission control and network management of the voice data packets. Those skilled in the art will appreciate that other protocols may be used to realize the advantages of the present system and method. The segments of the header of a typical RTP packet 200 which are of interest to the present method are shown in FIG. 2. The RTP header includes a sequence number 201, timestamp 202, and various other header information 203. Voice data 204 is appended to the header. Playback device 130 plays out the received voice packets in sequence number order, at the same rate at which the packets were transmitted.

As discussed above, jitter buffer 125 provides a de-jitter delay that allows slightly late voice packets extra time to arrive. However, there will still be cases where a voice packet does not arrive in time to be played. There may be several causes for this. First, the transmitter may have stopped sending voice packets for a while (due to silence suppression, for example). Second, the voice packet may arrive too late because of network delays, or the packet may have been lost in transit. A voice packet is considered to be 'late' if it does not arrive in time to be played back. This situation may occur even if the packet arrives in sequence. A packet is also 'late' if the packet arrives after a packet having a higher sequence number has already been played back. A voice packet is considered to be 'lost' if it never arrives during a given transmission. The operation of the present system does not depend on calculations based on 'lost' packets. A voice packet is considered to be 'missing' when the packet is not received within a predetermined interval, or 'period' (defined below). In the case where a (late) packet arrives after a voice packet having a higher sequence number has been played, processor 120 (or playback device 130) will discard or ignore the late packet having the lower sequence number. In accordance with the present method, late packets are not played back.

Figure 3:
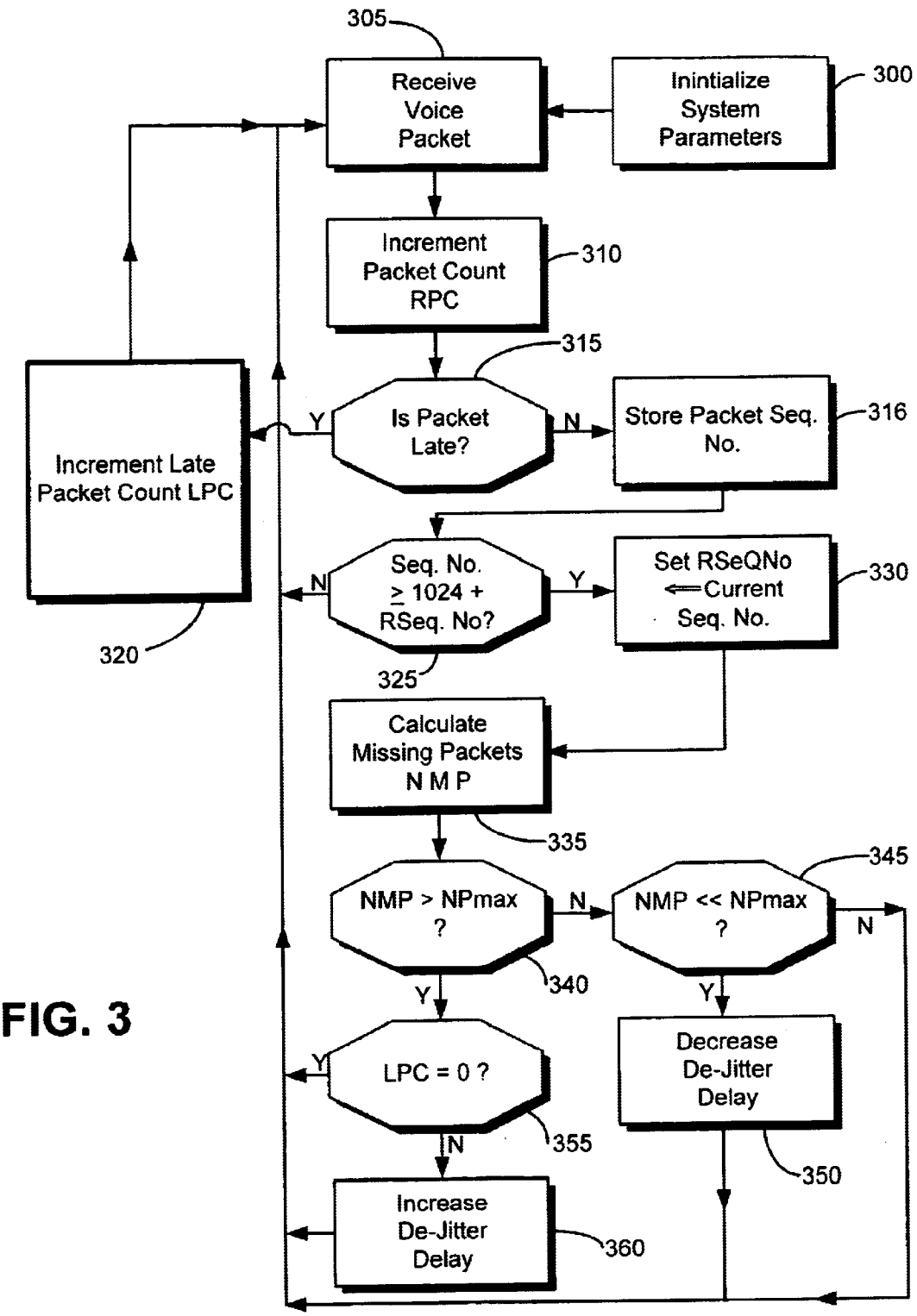
FIG. 3 is a flowchart depicting an exemplary method in accordance with the present invention.

FIG. 3 is a flowchart depicting an exemplary method in accordance with the present invention. Prior to operation, quality of service (QOS) parameters are selected. In an exemplary embodiment, these QOS parameters include the number of missing packets voice packets that can be tolerated over a given number of transmitted packets. Those skilled in the art will appreciate that the QOS factor Q may typically also include parameters such as the number of late voice packets, the amount of de jitter delay, the missing voice packet ratio, and/or other parameters. The missing voice packet ratio may indicate a tolerable limit with respect to the ratio of missing voice packets to the total number of transmitted voice packets, the total number of received voice packets, or the like.

In accordance with the present invention, the QOS parameters are based on a period of 1024 voice packets. This is the recurring period within which the number of late and missing voice packets are monitored. The 1024 voice packet period ensures that the program waits for a statistically significant number of voice packets to arrive before adjusting the jitter delay. The QOS parameters may be programmed into the receiver or the digital processor by a system user, and the QOS period may be set to a period other than 1024 packets.

At step 300, initialization of system parameters is performed. This initialization includes setting (programming) values for the maximum number of missing voice packets NMPmax; setting an initial value, a maximum value, and a value for incrementing/decrementing the de-jitter delay; and setting the missing voice packet ratio. NMPmax is a function of the desired QOS, and is user-selectable. The initial value of the de-jitter delay may be approximately 20 ms, but this initial value is not critical to proper system operation.

As shown in FIG. 3, at step 305, a voice packet is received at receiver 115. At step 310, the received packet count RPC for this period (of 1024 transmitted packets) is incremented. In accordance with an exemplary embodiment of the present invention, information in the RTP header, preferably the sequence number 201, or optionally, the timestamp 202, is used to keep track of the number and sequence of arriving packets. If this is the first received packet of a transmission, then the packet sequence number is stored in a reference sequence number RSEQ.

At step 315, a check is made to determine whether the presently received packet is 'late'. The packet is considered to be 'late' if it does not arrive in time to be played back. If the packet is late, the packet is discarded (not played), the late packet counter LPC is incremented at step 320, and the system waits for the next voice packet to be received at step 305. If the present packet is not late, then its sequence number is stored in SEQ, at step 316, for comparison with the next packet to be received Next, at step 325 it is determined whether 1024 voice packets have been transmitted in the present period. This determination is made by checking whether the sequence number of the current packet (SEQ) is equal to or greater than 1024 plus the reference sequence number RSEQ stored at the beginning of the present period. If the sequence number of the current packet is less than reference sequence number RSEQ, the system waits for the next voice packet to be received at step 305, and the above-described loop is repeated until the 1024 voice packet limit is reached.

The interval of 1024 voice packets (about 20 seconds for typical 20 ms packets) provides a statistically significant period in which to calculate the number of missing and late voice packets. Those skilled in the art will appreciate that this interval can be varied, as long as a statistically significant number of voice packets are accounted for. If at least 1024 voice packets have been transmitted, then at step 330, the reference sequence number RSEQ is (re)set to the sequence number of the current packet, and the number of missing voice packets NMP, for the present period, is then determined at step 335. The number of missing voice packets NMP is calculated by subtracting the number of packets actually received (RPC) from the value 1024, which is the number of packets that have been transmitted this period.

Next, at step 340, a check is made to determine whether there are more missing voice packets NMP than the maximum allowed number NMPmax set in step 300. If so, then at step 355, the late packet counter LPC is checked. If the late packet counter is equal to zero, then the de-jitter delay is not changed. Since there, are no late packets, the voice playback quality will not be improved by further expanding the window for receiving voice packets, i.e., by increasing the de-jitter delay. The present method thus distinguishes between late voice packets and lost voice packets to guard against unnecessary increase of the jitter delay when there are no late voice packets in a given 1024 packet (or other statistically significant) period. If, at step 355, the late packet counter is not equal to zero, then at step 360, the de-jitter delay is increased by the predetermined ( amount, not to exceed the programmed maximum value. In either case, the system then waits for the next voice packet to be received at step 305.

If, however, at step 340, it is determined that the number of missing voice packets NMP is not greater than the maximum number NMPmax, then a check is made at step 345 to see if there are significantly fewer number of missing voice packets (NMP) than NMPmax. Whether "significantly fewer" voice packets are missing is a determination made with respect to the missing voice packet ratio. In an exemplary embodiment, if the missing voice packet ratio is more than 0.5 percent lower than NMPmax, then at step 350, the de-jitter delay is decreased by the programmed amount. If the missing voice packet ratio is less than this amount, the de-jitter delay is not changed. In either case, the received packet count (RPC) and the late packet counter (LPC) are reset, and the system then waits for the next voice packet to be received at step 305.

Although the invention has been described herein with reference to the appended drawings, it will be appreciated that the scope of the invention is not so limited. Various modifications in the design and implementation of various components and method steps discussed herein may be made without departing from the spirit and scope of the invention, as set forth in the appended claims.

What is claimed is:

1. A method for compensating for jitter resulting from variations in propagation time of voice packets transmitted over a network, wherein the voice packets are received by a receiving system providing a de-jitter delay to compensate for the variations in said propagation time, the method comprising:

using header information in said packets to determine, within a predetermined interval, a number of missing packets, wherein said number of missing packets equals a total number of first voice packets that were transmitted to be received during said predetermined interval minus a total number of said first voice packets actually received by said receiving system during said predetermined interval; and adjusting the de-jitter delay as a function of the number of missing packets, within said predetermined interval, if said number of missing packets passes a missing packet threshold.

2. The method of claim 1, where the step of using header information further includes:

using sequence numbers in a transmission control header associated with each of said packets to calculate the total number of said packets transmitted.

3. The method of claim 2, wherein said transmission control header is a Real Time Protocol header.

4. The method of claim 1, wherein the step of adjusting the de-jitter delay includes:

decreasing the de-jitter delay when said number of missing packets is smaller than said missing packet threshold; and increasing the de-jitter delay when said number of missing packets is greater than said missing packet threshold.

5. The method of claim 1, wherein the step of using header information includes using sequence numbers in packet headers to determine said number of missing packets.

6. The method of claim 1, wherein said header information includes timestamp information in packet headers to determine said number of missing packets.

7. The method of claim 1, wherein said predetermined interval is a period during which a statistically significant number of packets arrive at said receiving system.

8. The method of claim 1, wherein said predetermined interval comprises an interval in which approximately 1,024 packets are received.

9. A method for compensating for jitter resulting from variations in propagation time of voice packets transmitted over a network, wherein the voice packets are received by a receiving system providing a de-jitter delay to compensate for the variations in said propagation time, the method comprising:

using header information in said packets to determine, within a current predetermined interval, a number of late packets received by said receiving system, wherein said late packets are those packets that did not arrive timely to be played back during a previous predetermined interval;

decreasing the de-jitter delay when a number of missing packets within said current predetermined interval is smaller than an initially determined maximum number of missing packets, wherein said number of missing packets equals a total number of first voice packets that were transmitted to be received during said current predetermined interval minus a total number of said first voice packets actually received by, said receiving system during said current predetermined interval; and increasing the de-jitter delay when at least one of said late packets is received in said current predetermined interval during which said number of missing packets is greater than said maximum number of missing packets.

10. The method of claim 9, wherein the step of using header information includes using sequence numbers in packet headers to determine said number of missing packets.

11. The method of claim 9, wherein said header information includes timestamp information in packet headers to determine said number of missing packets.

12. The method of claim 9, wherein said predetermined interval is a period during which a statistically significant number of packets arrive at said receiving system.

13. The method of claim 9, wherein said predetermined interval comprises an interval in which approximately 1,024 packets are received.

14. The method of claim 9, wherein said transmission control header is a Real Time Protocol header.

15. A method of adjusting a delay caused by a jitter buffer receiving a plurality of packets over a packet network, each of said plurality of packets having an arrival sequence, said method being performed during each of a plurality of predetermined intervals, said method comprising:

determining whether each packet of said plurality of packets is received late, wherein a packet is determined to be late if said packet is received after expiration of a previous predetermined period of time;

incrementing a late packet counter for each said packet that is determined to be late in said determining;

storing, in said jitter buffer, each said packet that is not determined to be late in said determining;

reading said arrival sequence of each said packet that is not determined to be late in said determining;

calculating a difference between said arrival sequences of two consecutive packets read in said reading;

incrementing a missing packet counter by said difference; and altering said delay if said missing packet counter passes a missing packet threshold;

wherein said missing packet counter equals a total number of first packets that were to be received during a current predetermined interval minus a total number of said first packets that were actually received during said current predetermined interval.

16. The method of claim 15, wherein said altering alters said delay by changing the size of said jitter buffer.

17. The method of claim 16, wherein said size of said jitter buffer is increased if said missing packet counter is greater than a predetermined maximum missing packet threshold and said late packet counter is greater than a predetermined late packet threshold.

18. The method of claim 17, wherein said predetermined late packet threshold is zero.

19. The method of claim 16, wherein said size of said jitter buffer is decreased if said missing packet counter is less than a predetermined minimum missing packet threshold.

20. The method of claim 15, wherein each of said plurality of predetermined interval is an interval during which approximately 1,024 packets are received.

21. The method of claim 15, wherein said arrival sequence is a sequence number.

22. The method of claim 15, wherein said arrival sequence is a time stamp.

23. A communication system comprising:

a receiver capable of receiving a plurality of packets over a packet network, each of said plurality of packets having an arrival sequence;

a jitter buffer causing a delay; and a processor capable of determining whether each packet of said plurality of packets is received late, said processor further capable of incrementing a late packet counter for each said packet that is determined to be late, and storing, in said jitter buffer, each said packet that is not determined to be late, wherein a packet is determined to be late if said packet is received after expiration of a previous predetermined period of time;

wherein said processor reads said arrival sequence of each said packet that is not determined to be late, calculates a difference between said arrival sequences of two consecutive packets read, increments a missing packet counter by said difference, and alters said delay if said missing packet counter passes a missing packet threshold, and wherein said missing packet counter equals a total number of first packets that were to be received during a current predetermined interval minus a total number of said first packets that were actually received during said current predetermined interval.

24. The communication system of claim 23, wherein said processor alters said delay by changing the size of said jitter buffer.

25. The communication system of claim 24, wherein said processor increases said size of said jitter buffer if said missing packet counter is greater than a predetermined maximum missing packet threshold and said late packet counter is greater than a predetermined late packet threshold.

26. The communication system of claim 25, wherein said predetermined late packet threshold is zero.

27. The communication system of claim 24, wherein said processor decreases said size of said jitter buffer if said missing packet counter is less than a predetermined minimum missing packet threshold.

28. The communication system of claim 23, wherein each of said current predetermined interval and said previous predetermined interval is an interval during which said receives approximately 1,024 packets.

29. The communication system of claim 23, wherein said arrival sequence is a sequence number.

30. The communication system of claim 23, wherein said arrival sequence is a time stamp.

* * * * *